June 10, 1941.  A. L. JACKSON  2,245,199
ELECTRIC AND HAND POWER DICER
Filed Oct. 9, 1935
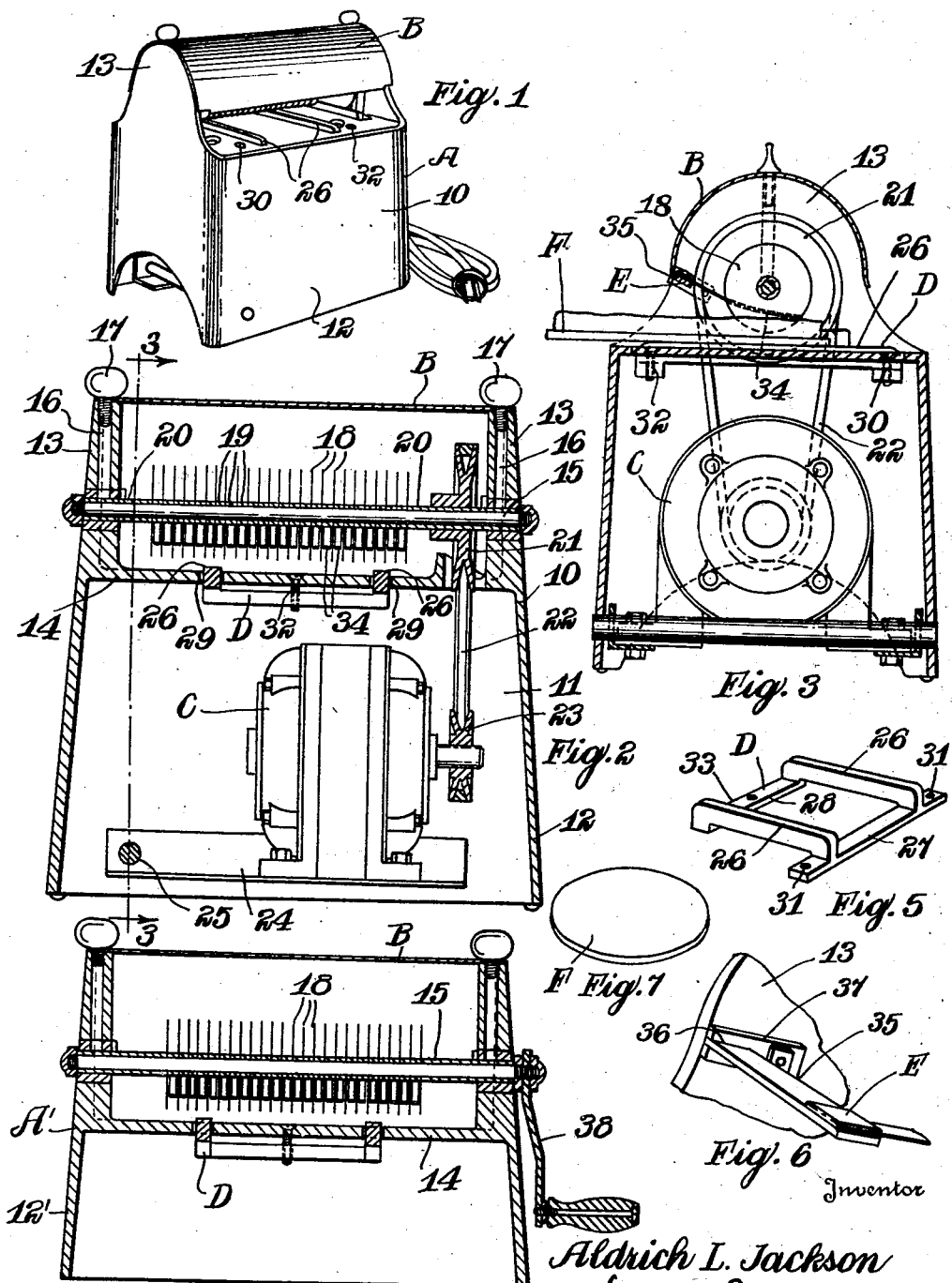

Patented June 10, 1941

2,245,199

UNITED STATES PATENT OFFICE 2,245,199

ELECTRIC AND HAND POWER DICER

Aldrich L. Jackson, Minneapolis, Minn., assignor to Federal Engineering Company, Minneapolis, Minn., a copartnership composed of Aldrich L. Jackson and Victor Delegard Application October 9, 1935, Serial No. 44,193

8 Claims. (Cl. 17—27)

This invention relates to an electric and hand-power dicer designed to slash steaks and other meats and articles of a similar character, where it is desired to cut the surface of the same, or shred it sufficiently to make it tender when cooked or broiled in a preheated pan on the slashed side first. It has been found by cutting meat in this manner that it makes the same tender and open just sufficiently to permit the heat to quickly penetrate the meat without breaking up the juice pockets in the meat, thereby making a more juicy and tasty steak when cooked or broiled.

A feature resides in providing a slasher for meat and the like, wherein a series of rotatable knives which are of a disc-shape are attached together on a shaft which holds the knives so that they can be removed and replaced when it is desired. The knives are clamped rigidly in place so that when the shaft is turned, the knives are rotated. Thus the knives are replaceable.

A feature is in providing a simple meat slasher which has a feed board on which the steak is laid so that it may be inserted under the cutting knives as the crank is turned. The dicer is operated by an electric motor and may also be operated by a hand crank.

It is also a feature to support the shaft which carries the knives in end standards which provide bearings for the same. The standards may be formed integral with the base, and the electric motor for operating the knives is adjustably positioned within the base. The standards are shaped to receive a hood guard for the knives, and the guard is held in place by thumb screws which also form closures for the oil passageways to the bearings in the standard.

The dicer is provided with a fibre feed plate or pallette upon which the steak is placed, and the pallette is adapted to ride upon adjustable tracks which extend under the cutting knives. The tracks are adjustable as to height in relation to the knives. This adjustment as to raising and lowering the tracks regulates the depth of the cut of the knives.

A still further feature is to provide a top or hood which extends over the top portion of the knives and projects on either side of the same. This hood is removably positioned on the top of the standards so that when the hood guard is removed, the knives are readily accessible for cleaning.

A further feature resides in providing a unitary spring stripper means which is composed of a series of parallelly spaced spring fingers connected together at the end by a frame portion. This unitary spring stripper acts as an under-guard for the cutting knives of the slasher and is detachably secured. When the unitary spring guard is held in position, the spring members extend downwardly between the lower edges of the cutting knives and act as resilient strippers which strip the meat from the cutting knives as the meat is passed under the same when it is placed upon a fibre feed plate or pallette which is adapted to carry the meat back and forth under the knives.

It is a feature to provide a self-adjusting support for an electric motor for driving the cutting knives which keeps the driving belt taut in the operation of the cutter. A further feature resides in providing a base which is adapted to contain and virtually conceal the electric motor for operating the cutting knives.

The dicer or slasher is of a unitary character as a whole, having the cutting disc-knives well guarded and by using the fibre feed plate upon which the meat is laid, together with the smooth tracks over which the plate slides under the cutting knives, I provide a dicer for steaks of a very desirable nature, because the feed plate with the steak on the same can be fed to the cutting knives very easily and readily turned to cut the meat crosswise into disc-like particles, or to slash the same in different directions, making the steak tender and more easily prepared for eating.

It is a further feature to provide a slasher or dicer for steaks and the like wherein spring guard fingers are provided which act as stripper means to clear the knives of the steak. These stripper fingers extend between and in close proximity to the disc knives and keep the knives clean and the steak from adhering to the same as the pallette with the steak is passed under the knives. The spring finger guard for the knives may be removed collectively which permits the free ends of the spring fingers to be used, cleansing the knives and the hub portions between the knives when it is desired.

It is also a feature to provide an adjustable unitary track means upon which the fibre feed plate rests in passing under the knives. This unitary track means may be removed as a unit if it is desired. The adjustment to raise or lower the tracks is of a simple character on the table or bed of the slicer frame.

In the drawing forming part of this specification:

Figure 1 is a perspective view of my electric-powered dicer.

Figure 2 is a central cross-section, showing the electric operating motor.

Figure 3 is a transverse section on the line 3—3 of Figure 2.

Figure 4 is a longitudinal cross-section of the hand-powered dicer.

Figure 5 is a perspective view of the unitary track for the fibre feed plate, showing the same removed from the bed of the dicer.

Figure 6 is a perspective detail, showing one end of the bar which holds the spring stripper and also showing the slotted bracket into which the bar fits.

Figure 7 is a perspective of the fibre feed plate or pallette, on which the steak or article to be diced is laid.

The dicer A is formed with a frame 10 which provides an electric motor compartment 11 within the base 12 of the frame 10.

The frame 10 is provided with integral end plates 13 which project upward from the bed 14 and provide bearings for the knife supporting and operating shaft 15. Oil holes 16 are formed in the end plates 13 so that oil may be directed to the bearings in the same. A knife guard hood B is supported by the end plates or standards 13 and thumb screws 17 hold the hood B in place. The hood B extends over the top and down the sides of the standards 13 to provide a substantial upper guard for the disc cutting knives 18 which are carried by the shaft 15. The screws 17 also form closures for the oil holes 16.

The disc knives 18 are adapted to be rigidly clamped between the bushings 19 and the end sleeves 20 to lock the same on the shaft 15. The shaft 15 is adapted to be operated by the V-grooved pulley 21 which is driven by the V belt 22 from the pulley 23 of the motor C. The motor C is mounted upon the floating bracket 24 being pivoted on one end to the shaft 25 and positioned within the motor compartment 11 of the base 12. The base 12 conceals the motor and protects it so that it may operate the belt 22 to rotate the cutting disc knives 18. The mounting 24 permits the motor C to float sufficiently to keep the belt 22 tight enough to readily operate the cutting knives 18 when slashing or dicing a steak. This mounting also provides the desired friction for the driving belt 22 by using a portion of the weight of the motor to automatically maintain the proper adjustment between the driving pulley 23 of the motor and the pulley 21 on the shaft 15.

The steak cutter A is provided with an adjustable unitary track means D which is formed with a pair of tracks 26. The tracks 26 are held spaced apart by the connecting members 27 and 28. This unitary track means D is held with the track portions 26 extending up through the slots 29 in the bed 14 by two screws 30 which engage in the threaded holes 31 formed in the end of the bar 27 and a single screw 32 which engages in the threaded hole 33 formed centrally in the bar 28. By operating the two screws 30, one end of the tracks may be raised or lowered, and by operating the single screw 32 the other end of the tracks 26 may be raised or lowered. The screws 30 and 32 have their slotted heads countersunk in the bed 14 and hold the track unit D floating in the slots 29. Thus it will be apparent that the operator of the machine A may readily adjust the height of the tracks or rails 26 in relation to the bed 14 and the knives 18 by simply adjusting the screws 30 and 32.

I provide a knife stripper and guard means E which is of a unitary character and composed of a series of spring fingers 34 which are held collectively by the mounting bar 35 on one end, while the free ends of the spring fingers 34 extend between the disc knives 18. The ends of the mounting bar 35 are supported in the slot 36 of the supporting bracket 37 to hold the stripping fingers 34 in proper position to strip the meat from the knives 18 in operation of the same. When it is desired, the spring guard unit E may be removed by removing the hood B and lifting the bar 35 out of the slot 36. When the unit E is so removed, the spring fingers 34 may be used to clean the hubs 19 of the knives 18. The electric-powered slasher or dicer A is provided with a pallette or fibre feed plate F shown in small size in Figure 7. This fibre feed plate F is disc-shaped and the steak which is to be diced is laid upon the plate or pallette F and then the pallette is slid under the knives riding upon the tracks 26. It will be apparent that after the steak has been slashed in one direction as the plate F passes under the knives 18, the steak may be slashed in a transverse direction to dice the steak to the depth desired according to the setting of the tracks 26 in relation to the knives 18. The feed plate or pallette F may be of any suitable size to support the steak and to travel on the tracks 26 under the knives 18 in the space provided in the machine A.

The slasher or dicer may be made in the form A', illustrated in Figure 4, where the shaft 15 is operated by the hand crank 38 so as to operate the knives 18. In the form A', the steak dicer is provided with a short base portion 12'. The other portions of the dicer A' are virtually identical to those heretofore described in the dicer A. This hand-powered dicer is provided with the guard B and the track unit D.

It will be apparent that my electric dicer is very desirable in operating to dice a steak by simply placing a steak on the disc fibre feed plate F and pushing the same along the tracks under the knives 18 and thus virtually instantly slashing the steak as desired. The feed plate F is fed under the knives so as to slide under the spring fingers 34 in the direction of the arrow indicated in Figure 3. The knives 18 are completely guarded to protect the operator. The hood B may be readily removed and the tracks 26 are easily adjusted to give the desired depth of cut of the disc knives 18. The knives 18 may also be removed when it is desired.

My meat slasher or dicer is easy to clean and sharpen. The cover completely guards the revolving knives and keeps the fingers at a safe distance. The cover may also be quickly removed for sharpening or wiping by removing the stripper unit which forms a scraper assembly. Thus the dicer may be cleaned completely in a few moments and sharpened easily by touching a sharpening stone to the revolving knives.

I claim:

1. A meat slashing device including a series of equally spaced apart rotary cutting knives, means for rotating said knives, a feed table for receiving the meat to be slashed adapted to be fed under said knives, an upper and lower guard means extending over and under said knives, and means for detachably connecting the same in relation to said knives without disturbing the position of said knives, said upper guard means extending over and enclosing, said detachable connection of said lower guard means.

2. A slasher including a table, standards projecting up from the ends of said table, a shaft adapted to be rotatably supported by said standards, means for operating said shaft, a series of slashing knives supported on said shaft, means for spacing said knives apart, an arcuated guard head extending over said knives supported by said standards, a removable spring finger scraper assembly, an adjustable track assembly extending under said knives, said track including spaced parallel bars connected together at opposite ends, and means adjustably supporting said ends, and a disc feed plate for receiving the article to be slashed adapted to slide on said track assembly.

3. An electrically operated steak or the like slasher or dicer including a unitary hollow base having end plate-like upright standards, an electric motor adapted to be positioned within said base to conceal the same, a series of thin disc-like cutting knives, a shaft supported between said standards adapted to support said knives, a belt from said motor to said shaft to rotate said knives, a removable guard hood over said knives, a removable wiping stripper scraper assembly having free ended individual spring fingers projecting between the lower edges of said knives, a floating track assembly adjustably positioned below said knives to regulate the depth of the cut thereof, and a nonmetallic feed plate adapted to be fed under said knives on said track assembly and on which the steak or article to be sliced or diced is adapted to be placed.

4. An electric steak tendering device comprising a hollow base, a table across the top of said base, integral standards forming end guard plates projecting up from said base, a shaft rotatably supported by said standards, a series of disc-like cutting knives rigidly secured to said shaft, a removable hood guard for said knives supported by said standard, a floating adjustable track means supported projecting above said table, a fibre feed plate adapted to ride on said track means, stripper scraper means for the lower edges of said knives, an electric motor for driving said shaft, and means for floatingly supporting said motor to maintain a taut driving friction between said electric motor and said shaft.

5. A meat-slitting machine including a table, standards projecting up from the ends of the table, a shaft adapted to be rotatably supported by said standards, means for operating said shaft, a series of slitting knives supported on said shaft, means for spacing said knives apart, a guard member extending over said knives and supported by said standards, a removable spring finger stripper assembly, an adjustable track assembly extending under said knives, said track assembly including spaced parallel bars, means adjustably supporting said bars, and a plate for receiving the meat to be slit and adapted to slide on said track assembly.

6. An electrically operated steak slitting machine including a unitary hollow base having end upright standards, an electric motor adapted to be positioned within said base, a series of thin disc-like cutting knives, a shaft supported between said standards adapted to support said knives, a belt from said motor to said shaft to rotate said knives, a guard hood over said knives, a removable wiping stripper finger assembly supported by said standards and having free-ended individual spring fingers projecting between the lower edges of said knives, a floating track assembly adjustably positioned below said knives to regulate the depth of the cut thereof, and a feed plate adapted to be fed under said knives on said track assembly and on which the steak or article to be slit is adapted to be placed.

7. An electric steak tendering device comprising a hollow base, a table across the top of said base, integral standards forming end guard plates projecting up from said base, a shaft rotatably supported by said standards, a series of disk-like cutting knives rigidly secured to said shaft, a hood guard for said knives supported by said standards, a floating adjustable track means supported by and projecting above said table, a feed plate adapted to ride on said track means, stripper means for the lower edges of said knives removably supported by said standards, a electric motor for driving said shaft, and means for floatingly supporting said motor to maintain a taut driving friction between said electric motor and said shaft.

8. A meat dicer comprising a table designed to receive a feed plate, a series of spaced rotary knives, a shaft rotatably supporting said knives above said table, means rotatably supporting said shaft, a removable stripper finger assembly, and means spaced forwardly from said knives supporting said assembly, said assembly including a series of spaced spring fingers, each finger extending between a pair of spaced knives, in a direction downwardly and rearwardly past the center of the knives spaced below the supporting shaft for the knives and terminating normally slightly below the approximate level where the knives leave the meat, so that a slight downward pressure is exerted on the meat by the end of each individual finger at the point of discharge of the knife from the meat, to retard the meat and hold the same in place upon its feed plate.

ALDRICH L. JACKSON.